United States Patent
North et al.

(10) Patent No.: US 11,636,078 B2
(45) Date of Patent: Apr. 25, 2023

(54) PERSONALLY IDENTIFIABLE INFORMATION STORAGE DETECTION BY SEARCHING A METADATA SOURCE

(71) Applicant: ServiceNow, Inc., Santa Clara, CA (US)

(72) Inventors: Alexander North, Santa Clara, CA (US); Nicholas Farrenkopf, Santa Clara, CA (US); Kyle Del Castillo, Santa Clara, CA (US)

(73) Assignee: ServiceNow, Inc., Santa Clara, CA (US)

(*) Notice: Subject to any disclaimer, the term of this patent is extended or adjusted under 35 U.S.C. 154(b) by 34 days.

(21) Appl. No.: 16/858,288

(22) Filed: Apr. 24, 2020

(65) Prior Publication Data

US 2021/0334407 A1 Oct. 28, 2021

(51) Int. Cl.
| | |
|---|---|
| G06F 16/00 | (2019.01) |
| G06F 16/22 | (2019.01) |
| G06F 16/28 | (2019.01) |
| G06F 16/242 | (2019.01) |
| G06F 16/248 | (2019.01) |
| G06F 21/62 | (2013.01) |

(52) U.S. Cl.
CPC ........ *G06F 16/2228* (2019.01); *G06F 16/248* (2019.01); *G06F 16/2445* (2019.01); *G06F 16/284* (2019.01); *G06F 21/6254* (2013.01)

(58) Field of Classification Search
CPC ............... G06F 21/6254; G06F 16/284; G06F 16/2445; G06F 16/2228; G06F 16/248
USPC .................................................. 707/600–899
See application file for complete search history.

(56) References Cited

U.S. PATENT DOCUMENTS

| | | | | |
|---|---|---|---|---|
| 8,600,851 | B1* | 12/2013 | Pacheco | G06Q 40/04 |
| | | | | 705/35 |
| 8,924,523 | B1* | 12/2014 | Dickie | G06Q 30/0271 |
| | | | | 705/14.66 |
| 10,476,674 | B2* | 11/2019 | Scheiblauer | H04L 9/3239 |
| 10,885,225 | B2* | 1/2021 | Balzer | G06F 21/6254 |
| 2007/0078856 | A1* | 4/2007 | Dettinger | G16H 10/60 |
| 2010/0088313 | A1* | 4/2010 | Hoffman | G06F 16/22 |
| | | | | 707/733 |
| 2014/0283089 | A1* | 9/2014 | Arya | G06F 21/6245 |
| | | | | 726/26 |
| 2015/0112996 | A1* | 4/2015 | Mishra | G06F 16/134 |
| | | | | 707/741 |
| 2018/0225192 | A1* | 8/2018 | Alagiriswamy | G06F 11/3495 |
| 2019/0122005 | A1* | 4/2019 | Larson | H04L 63/12 |
| 2019/0243845 | A1* | 8/2019 | Meil | G06F 16/9024 |
| 2019/0392059 | A1* | 12/2019 | Wu | G06F 16/2282 |
| 2020/0201867 | A1* | 6/2020 | Lappas | G06F 9/44526 |

* cited by examiner

*Primary Examiner* — Michelle N Owyang
(74) *Attorney, Agent, or Firm* — Van Pelt, Yi & James LLP (57) ABSTRACT

A configuration associated with locating personally identifiable information stored in a database is received. An alternate metadata source separate from the database is identified. The separate alternate metadata source is searched using the configuration to identify locations in the database that store personally identifiable information.

20 Claims, 5 Drawing Sheets

PERSONALLY IDENTIFIABLE INFORMATION STORAGE DETECTION BY SEARCHING A METADATA SOURCE

BACKGROUND OF THE INVENTION

Personally identifiable information (PII) is any data that could potentially be used to identify a particular person. Examples of PII include a person's name, address, social security number, date and place of birth, mother's maiden name, driver's license number, bank account number, passport number, email address, biometric records, and any other information that is linked or linkable to an individual, such as medical, educational, financial, and employment information. In many jurisdictions, storage of PII is regulated by government authorities. For example, many organizations, such as businesses, are required to be able to identify where they store PII of customers, employees, and the general public. Thus, it would be beneficial to develop techniques directed toward improving detection of PII in storage systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting personally identifiable information (PIT) is disclosed. A configuration associated with locating personally identifiable information stored in a database is received. An alternate metadata source separate from the database is identified. The separate alternate metadata source is searched using the configuration to identify locations in the database that store personally identifiable information.

A practical and technological benefit of the techniques disclosed herein is faster identification of locations in a database that store PII. Searching a metadata source separate from the database is faster than searching the database directly for instances of PII, which can be prohibitively time-intensive because the database may store a very large amount of data (e.g., terabytes of data). Another benefit is that access to the data in the database does not need to be granted to a third party (e.g., a database search service that does not own the data in the database); specifically, there is no need to transmit data to a third party cloud network. In many scenarios, access cannot be granted to the third party because doing so would violate data privacy regulations.

In many scenarios, businesses and other organizations are required to be able to identify where they store PII related to customers, employees, and the general public. The businesses and other organizations may use a software platform (e.g., a platform as a service (PaaS)) to interface with database storage. The software platform is used to cause storage of PII in a database that may be provided by a different entity than the provider of the software platform. It is possible to lose track of PII storage, e.g., due to the passage of time, multiple teams and/or multiple administrators using the software platform and using different naming conventions, etc. There may not be a single person who knows or can recognize where PII is stored for any given instance of a software platform. Thus, the techniques disclosed herein are beneficial because they assist in the detection of PII that otherwise may be difficult to track. A further benefit of the techniques disclosed herein is flexibility in that PII detection can be performed in both automated and manual modes (e.g., manual mode to allow for human verification and added confidence in detection results).

In various embodiments, PII search functionality is implemented via a PII scanner that is included in a software platform, e.g., a PaaS. As used herein, a PaaS refers to a service (e.g., a cloud computing service) that provides a platform allowing users to develop, run, and/or manage applications without needing to build and maintain their own infrastructure to develop, run, and/or manage the applications. Each subscriber of the PaaS runs an instance of the PaaS. PII searches may be scheduled or performed on ad-hoc basis. In various embodiments, the PII scanner searches for PII within data of the instance of the PaaS. In various embodiments, the PII searches analyze metadata components of data associated with an instance of a PaaS. As used herein, metadata refers to data that describes and gives information about other data. In various embodiments, the metadata describes data (that can include PII data) stored in one or more databases managed by the PaaS.

Data stored in a database may be organized as tables and fields (referred to herein as database tables and database fields). As used herein, a table refers to a data structure that organizes information into rows and columns. As used herein, a field refers to a data structure that stores a single piece of data in a table. Fields can be organized into records, which contain all the information within a table relevant to a specific entity. For example, in a table called employee information, legal name may be a field in a row that also includes other fields (e.g., employee identification number, date of birth, social security number (ssn), street address, city, e-mail, etc.) and each row of the table would be a record for an employee. In this example, records make up the table rows and fields make up the table columns. The above database table example is merely illustrative. In various embodiments, each PaaS instance includes custom database tables and fields.

Metadata may also be organized as tables and fields (referred to herein as metadata tables and metadata fields). With respect to the employee information table example above, a simple example metadata table may include three columns, of which one row may have the fields "legal name", "string", and "Employee's full legal name". In this simple metadata table, "legal name" is what a column in the database table stores, "string" is the data type for "legal name", and "Employee's full legal name" is an explanation for what "legal name" means. In this example, additional rows could also be present for employee identification number, date of birth, social security number, street address, city, e-mail, etc. The above metadata table example is merely illustrative. Various metadata table structures (e.g., more complex structures) with various types of metadata fields may exist.

Results of PII searches (e.g., performed by the PII scanner) may also be organized as tables and fields (referred to herein as PII tables and PII fields). In various embodiments, PII tables provide a high-level overview of data storage in various database tables, as well as specific information about types of data being stored. In various embodiments, the PII scanner is configured according to a set of PII definitions (what constitutes PII) and PII exclusions (what does not constitute PII). In various embodiments, database data is not transmitted outside of the instance that is scanned for PII. In various embodiments, database data and schema are not searched during an automated PII search; instead, metadata tables and fields associated with the database data are searched to detect PII in the database data. In various embodiments, these metadata tables are automatically populated (e.g., by applications using the database data) to reflect the corresponding database data.

Figure 1:
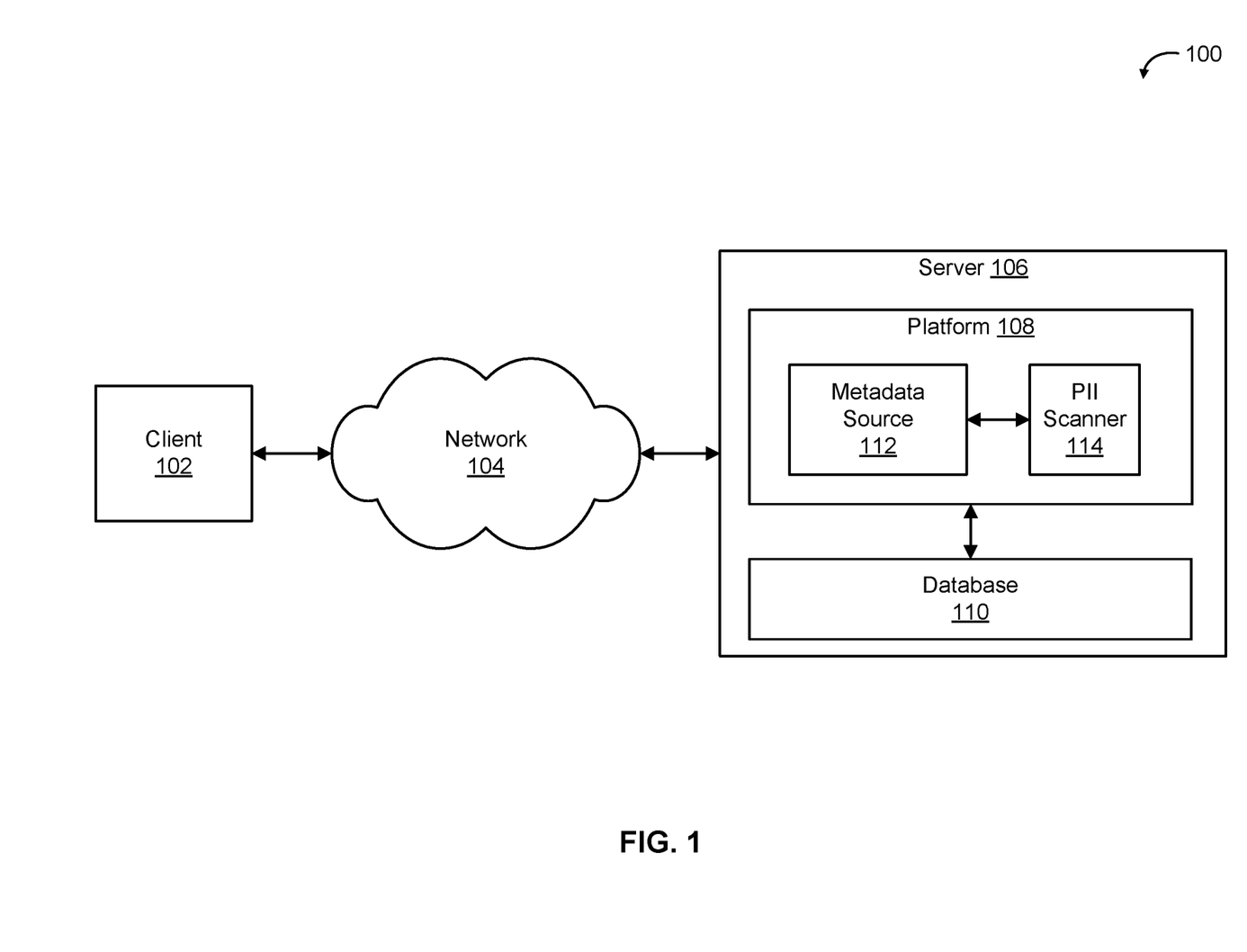
FIG. 1 is a block diagram illustrating an embodiment of a system for identifying locations in a database that store personally identifiable information.

FIG. 1 is a block diagram illustrating an embodiment of a system for identifying locations in a database that store personally identifiable information. In the example shown, system 100 includes client 102, network 104, and server 106. In various embodiments, client 102 is a computer or other hardware device that a user utilizes to interact with server 106. Examples of a client hardware device include: a desktop computer, a laptop computer, a tablet, a smartphone, or any other device. In various embodiments, the client hardware device includes a software user interface through which the user interacts with server 106. In some embodiments, the software user interface controls a PaaS that is at least in part stored on server 106. In various embodiments, the software user interface is utilized to initiate PII searches.

In the example illustrated, client 102 is communicatively connected to network 104. PII search requests may be transmitted to and responses received from server 106 via network 104. Examples of network 104 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, server 106 is a computer or other hardware component that stores a platform that includes PII search functionality.

In the example shown, platform 108 runs on server 106. In various embodiments, platform 108 is an instance of a PaaS. In various embodiments, platform 108 includes a collection of programs or pieces of software (not shown in FIG. 1) designed and written to fulfill various particular purposes (e.g., information technology, human resources, cybersecurity, and/or other purposes). Platform 108 is communicatively connected to database 110 and causes data, some of which includes PII, to be stored in database 110. Database 110 is a structured and organized collection of data stored on server 106. It is also possible for database 110 to be located at least in part on a server separate from but communicatively connected to server 106. In various embodiments, when platform 108 updates data in database 110 (e.g., causes new data to be stored), platform 108 also updates metadata source 112 to reflect the updating of database 110. For example, platform 108 may create and populate a new database table with employee information data in database 110 and concomitantly create a corresponding metadata table in metadata source 112. Metadata source 112 is a structured and organized collection of metadata. In various embodiments, metadata source 112 includes metadata tables and fields. In the example shown, metadata source 112 is located within platform 108. It is also possible for metadata source 112 to be separate from but communicatively connected to platform 108. For example, it is possible for metadata source 112 to be located at least in part on a server separate from but communicatively connected to server 106.

In various embodiments, PII scanner 114 determines locations within database 110 where PII is stored. PII scanner 114 is a software tool within platform 108. In various embodiments, PII scanner 114 performs searches for PII located in database 110 based at least in part on a configuration that it receives. In some embodiments, PII scanner 114 receives the configuration from client 102. Client 102 may use a user interface to select PII search settings. In the example shown, PII scanner 114 is communicatively connected to metadata source 112. In various embodiments, PII scanner 114 searches for PII in database 110 by searching metadata source 112 using the received configuration instead of directly searching database 110. Searching an alternate metadata source separate from database 110 is advantageous in terms of speed and efficiency because database 110 may be prohibitively large to be searched directly.

In the example shown, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. For example, additional clients that connect to server 106 may exist. Furthermore, PII scanner 114 may be utilized to search for PII in multiple databases by searching multiple metadata sources. The number of components and the connections shown in FIG. 1 are merely illustrative. Components not shown in FIG. 1 may also exist.

Figure 2:
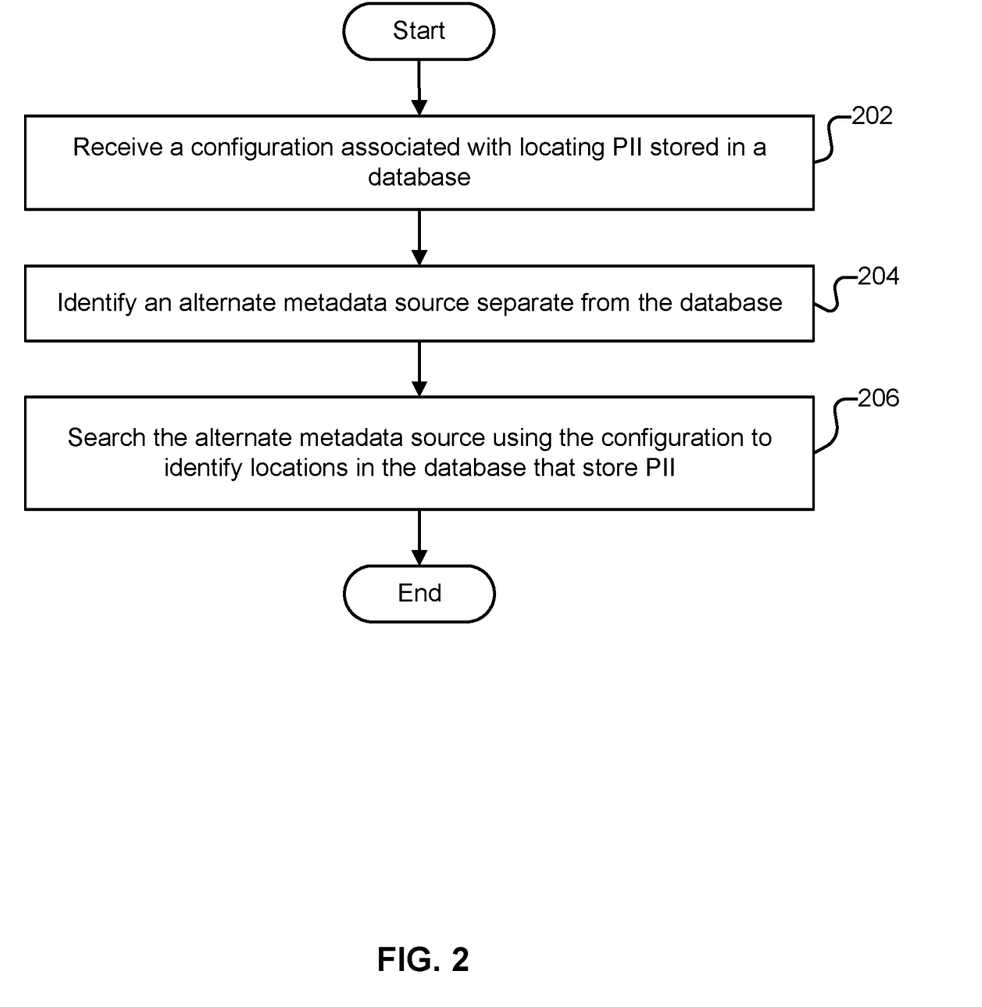
FIG. 2 is a flow chart illustrating an embodiment of a process for identifying locations in a database that store personally identifiable information.

FIG. 2 is a flow chart illustrating an embodiment of a process for identifying locations in a database that store personally identifiable information. In some embodiments, the process of FIG. 2 is performed by PII scanner 114 of FIG. 1.

At 202, a configuration associated with locating PII stored in a database is received. In some embodiments, the configuration includes PII definitions and PII exclusions. In various embodiments, the PII definitions includes a list of search terms for PII (e.g., "first name", "social security number", etc.) that are matched against metadata components. In various embodiments, PII exclusions includes a list of words to exclude from a PII search, such as very common and/or short words or terms that do not reliably indicate the presence of PII (e.g., "name"). In various embodiments, the database (e.g., database 110 of FIG. 1) stores data created and managed by a software platform (e.g., platform 108 of FIG. 1).

At 204, an alternate metadata source separate from the database is identified. In some embodiments, the alternate metadata source is metadata source 112 of FIG. 1. In some embodiments, the alternate metadata source is a data structure that includes a plurality of metadata tables that correspond to a plurality of database tables. In various embodiments, the alternate metadata source is updated as the database is updated. Thus, search results based on searching the alternate metadata source are consistent with search results based on directly searching the database.

At 206, the alternate metadata source is searched using the configuration to identify locations in the database that store PII. In various embodiments, the alternate metadata source's tables and fields are searched using search terms provided in a list of PII definitions. Searches may be conducted on a scheduled or ad-hoc basis. In various embodiments, search results are stored in fields and tables that correspond in structure to the alternate metadata source. In some embodiments, stored search results include information regarding which PII fields are used by which applications and/or other components of a software platform. In some embodiments, manual validation is performed (by a human) on the search results and any manually excluded results are added to a list of PII exclusions for subsequent searches. In various embodiments, search results are reported (e.g., to client 102 of FIG. 1).

Figure 3:
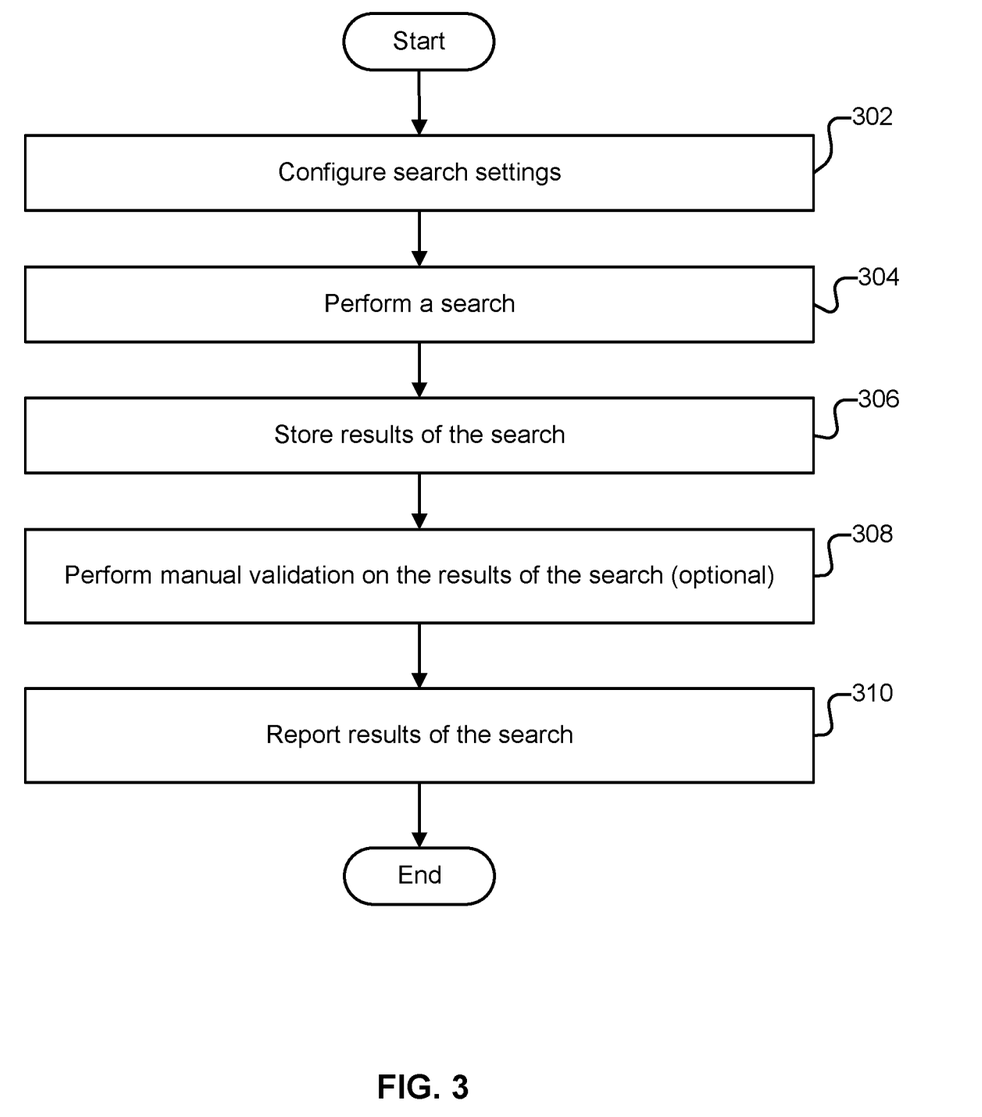
FIG. 3 is a flow chart illustrating an embodiment of a process for performing a search for personally identifiable information.

FIG. 3 is a flow chart illustrating an embodiment of a process for performing a search for personally identifiable information. In some embodiments, the process of FIG. 3 is performed by PII scanner 114 of FIG. 1. In some embodiments, at least a portion of the process of FIG. 3 is performed in 206 of FIG. 2.

Figure 4:
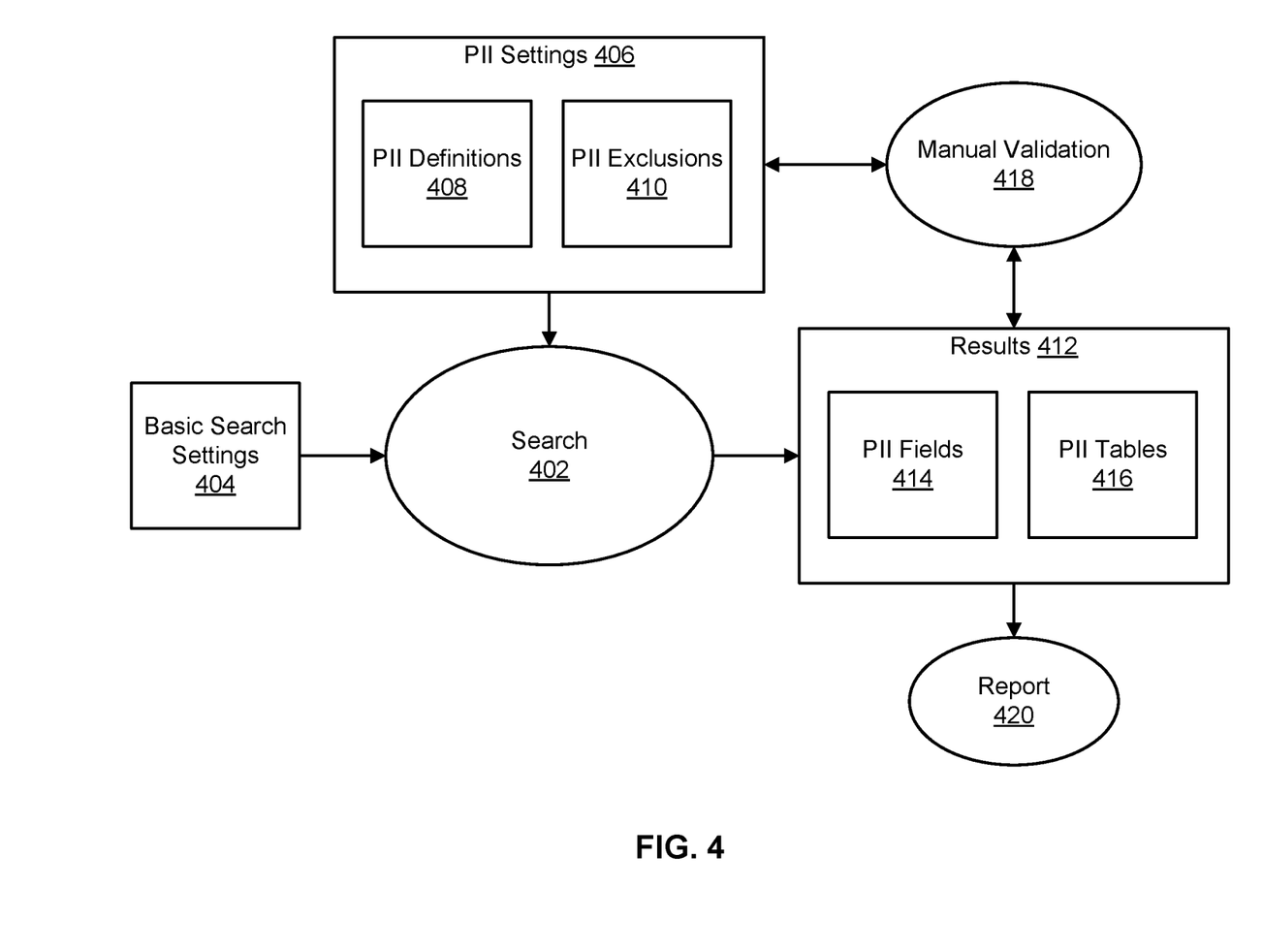
FIG. 4 is a diagram illustrating an example flow of data in a search for personally identifiable information.

At 302, search settings are configured. In various embodiments, search settings include basic search settings and PII settings. In FIG. 4, which shows an example data flow for a search for PII, search 402 has basic search settings 404 and PII settings 406 as inputs. FIG. 4 is referenced with respect to the following description of the process of FIG. 3 to more clearly illustrate the process of FIG. 3 by showing in diagrammatic form how data may flow. Examples of basic search settings include: locations to be searched (e.g., which portions of an identified metadata source and/or which specific metadata tables are to be searched), a preset search start time (if applicable), whether the search is a recurring search, frequency (for recurring searches), manual validation (described below) on/off status, etc. In various embodiments, PII settings include PII definitions and PII exclusions. In FIG. 4, these are shown as PII definitions 408 and PII exclusions 410.

PII definitions classify terms that should be captured, e.g., "first name", "last name", "appointment details", "social security number", etc. A plurality of PII definitions can be stored in a PII definitions file in which each definition delineates specific words and terms that are indicative of PII. In various embodiments, each definition includes one or more base terms. For example, a PII definition for Nationality may have a single base term "nationality" such that metadata results containing "nationality" are returned. As another example, a PII definition for Salary may include the base terms "salary", "direct deposit", "base pay", and "compensation". Each PII definition may also optionally include one or more additional terms that are to be searched in conjunction with the base terms. For example, a PII definition for Full Name may include the base term "name" and additional terms "full" and "legal". In this example, positive matches are triggered if the base term "name" plus at least one of the additional terms is found.

In some embodiments, when a PII definition has multiple base terms, a positive match is triggered if all base terms are found. If a PII definition has multiple base terms and multiple additional terms, a positive match may be triggered if all base terms and at least one additional term are found. Searches for base terms and additional terms may be further customized by one or more flags indicating whether terms need to be found exactly. Requiring terms to be found exactly can reduce false-positive results (falsely determining that locations store PII when they do not). In some embodiments, if a base term has fewer than a specified number of characters (e.g., four characters), finding the base term exactly may be required in order to reduce false-positive results (e.g., requiring finding "age" exactly would filter out matches such as "manage", "usage", etc.). The mechanics of using base terms and additional terms in searches are described in further detail below. Various ways to configure/combine terms for searching may be utilized. In some embodiments, a master set of PII definitions that is constant across all PII searches is utilized. Additional PII definitions tailored to each specific PII search may be added to the master set.

Analogous to PII definitions, a plurality of PII exclusions can be stored in a PII exclusions file in which each exclusion delineates specific words and terms that should not trigger PII positive matches. For example, database field labels that contain "Product Name" or "Task Name" can be excluded because these types of names are not PII. Names associated with business units, components, etc. are also not PII. In some embodiments, after an initial automated PII search, exclusions are marked so that they can be examined again during a manual validation phase. It is also possible to remove exclusions after the initial automated PII search so that they are not examined again during the manual validation phase. In some embodiments, specific database tables and/or fields may also be excluded using the PII exclusions mechanism.

At 304, a search is performed. In various embodiments, the search is a PII search whose results are stored and reported. In various embodiments, the search is conducted on an identified metadata source to identify locations in a corresponding database that stores PII. In various embodiments, the search is performed based at least in part on a plurality of search settings. Search settings are described in further detail above. In various embodiments, search settings are received in a configuration. In various embodiments, at least a portion of the configuration is transmitted by a user requesting the search. In some embodiments, a portion of the configuration (e.g., some PII definitions) is constant across searches and thus does not need to be transmitted by the user for each search. In the data flow example shown in FIG. 4, the search is illustrated as search 402, which receives basic search settings 404 and PII settings 406, wherein PII settings 406 includes PII definitions 408 and PII exclusions 410.

In various embodiments, metadata tables and fields (e.g., of metadata source 112) are searched. For example, in an employee information metadata table, fields that store database column labels may be searched. If these fields include terms such as "legal name", "social security number", and so forth, then it may be determined that the associated columns of the corresponding employee information database store PII. Other metadata fields can also be searched. For example, fields explaining column labels may also be examined to determine whether the associated columns store PII. In various embodiments, metadata tables include fields that refer (e.g., point to) other tables. The fields that point to other tables are referred to herein as reference fields. In various embodiments, tables exposed by reference fields are also searched. Thus, for example, a search that is configured to search a single metadata table can cover many more tables if reference fields are encountered.

In some embodiments, the search is configured to surface PII from all of the database tables and fields associated with an instance of a PaaS. In various embodiments, meta information is examined to determine whether PII is stored in any particular database table or field. For example, database table names, column labels, field labels, and elements (as found in meta information) may be examined. In this context, labels refer to front-end text that is shown to a user and elements refer to back-end text not shown to the user. In various embodiments, labels (but not elements) can be changed and often are different from their corresponding elements, which makes it beneficial to search both labels and elements for PII.

In some embodiments, two primary types of queries are utilized: contains and exact. Options for PII definitions and PII exclusions can be used to specify query type. For "contains", text is found anywhere in the search text. A "contains" search is more computationally intensive and can be overly inclusive. For example, "manage" and "outage" both contain "age", but are not PII. In general, the smaller the word, the more likely it is to be contained within another word. An "exact" query requires an exact finding in the search text. An "exact" search is less computationally intensive but may not be inclusive enough in certain scenarios. Both types of searches have their appropriate use cases.

There are various ways in which PII definitions can be configured for the search. In some embodiments, a master definitions list is utilized (e.g., PII definitions that have no particular search associated with them and are used to generate definitions whenever any search is run). PII definitions can be stamped into a PII definitions table so that at a later point it is possible to view which definitions were used to generate which search results. In some embodiments, base terms for a PII definition are received as a comma-separated list of words and/or phrases. Base terms usually indicate PII. For example, "name" in the context of people and "social security number" in any context are PII. In some embodiments, additional terms are also received as a comma-separated list of words and/or phrases. Additional terms can be utilized to reduce the inclusiveness of overly inclusive base terms. For example, "name" is an overly inclusive base term that can be found in many non-PII contexts but is indicative of PII when combined with the additional term "first" or "legal" (as in "first name" and "legal name"). In some embodiments, when additional terms are included, exactly finding at least one base term is required.

In various embodiments, for each PII definition, a keyword search that combines one or more keywords according to various combination rules is performed. For example, "contains" (not exact) searches can be performed for base terms, such as a search for the base term "Salary", which returns (non-case sensitive) results for "Minimum Salary", "salary max, u salary", etc. As another example, "exact" searches can also be performed for base terms, such as a search for the base term "Age", which returns (non-case sensitive) results for "Age" and "age". As another example, a base term plus additional term search can be performed in which an exact finding is required for just the base term. Such a search for the base term "name" and additional term "first" returns (non-case sensitive) results for "First name" and "Legal First Name". Base terms that are common words such as "name" and "state" are typically combined with additional terms in order to reduce false-positives matches. An additional rule that a term with fewer than four characters only returns a match if a search target starts with, ends with, or is that term may also be utilized. Such a rule reduces false-positive matches caused by small words.

In some embodiments, a confidence is calculated for each PII match. The confidence indicates the degree of confidence that a positive match is in fact PII. In some embodiments, the confidence is a number. In some embodiments, the confidence is selected from a discrete set of options (e.g., "High Confidence", "Medium Confidence", "Low Confidence", and "Unknown"). In some embodiments, only matches with a specified high level of confidence are marked as PII. In some embodiments, matches with a specified low level of confidence are marked as non-PII. Determining confidence is described in further detail herein (e.g., see FIG. 5).

At 306, results of the search are stored. In some embodiments, results are stored in results tables. In the example shown in FIG. 4, results of search 402 are stored in results 412, which includes PII fields 414 and PII tables 416. PII tables and PII fields are results tables that hold PII location information at a database table and a database field level, respectively. Examples of information from a PII search that a PII table stores include: whether PII is stored in a database table corresponding to the PII table, whether the corresponding database table has a reference to another database table that stores PII, a reference to a PII scan data object (discussed below), names of various tables (e.g., the PII table, the corresponding database table, a corresponding metadata table, etc.), number of fields found to store PII, number of fields examined in the PII search, a list of fields that store PII, and other high-level results summarizing PII search results. In various embodiments, the PII scan data object includes settings information related to the PII search (e.g., start time, end time, search duration, current status, manual validation status, etc.). Example of information from the PII search that a PII field stores include: a field label, a field element, a field data type (e.g., integer, string, etc.), whether the field stores PII, whether the field refers to a table that stores PII, which table the field is a part of, which PII definition triggered a determination that the field stores PII, a PII scan data object associated with the field, and other field-level characteristics.

At 308, manual validation on the results of the search may be performed. In various embodiments, manual validation is optional. A user requesting the search may choose to accept search results without manual validation. The user may also specify in basic search settings that the search is to be paused to allow for manual validation before finalizing and reporting search results. In some embodiments, manual validation is required for each result for which a corresponding confidence value is unknown or otherwise necessitates human judgment. In the example shown in FIG. 4, manual validation 418 is performed on results 412. In addition, manual validation 418 interacts with PII settings 406 because manual validation can modify PII settings for subsequent searches. For example, PII matches that have been validated as PII can be kept and PII matches that have been manually determined to not be PII can be excluded (e.g., included in PII exclusions 410). In addition, incorrect PII exclusions may be reversed (e.g., removed from PII exclusions 410). In some embodiments, different PII exclusion types are utilized. For example, "Exclude from Search" (EFS) and "Mark as No After Search" (MANAS) types may be utilized. EFS refers to exclusions from an initial automated search. EFS records may be combined for one database search at the start. MANAS refers to results that are marked as not being PII after a search has been run. MANAS results may be changed during manual validation. In various embodiments, manual validation is performed in a user interface. When manual validation has been completed, the user can use the user interface to indicate that PII search status should be changed to a "complete" status.

At 310, results of the search are reported. In the example shown in FIG. 4, results 412 are handled by report 420. In some embodiments, search results are reported through a user interface in which the user can interactively view the search results. For example, the user may start by viewing a PII scan data object that has links to other related lists. In various embodiments, the user interface displays PII tables (high-level overviews of table objects), PII fields (results of individual field objects), and PII definitions and PII exclusions (PII settings used for the search). In various embodiments, PII fields are linked to PII definitions in the sense that fields that triggered particular definitions can be viewed. In various embodiments, PII tables are linked to PII fields in the sense that field-to-table associations can be viewed. Display of PII fields results may be filtered to show results according to various groupings, e.g., by PII definition, field type, etc. Display of PII tables may be filtered to show results according to various groupings, e.g., by number of PII fields found, by tables with references to other tables, in a format that shows parent tables and their linked child tables, etc. PII definitions and PII exclusions may be updated by the user after viewing search results. A new search may be initiated using the updated settings and/or different combinations of base terms and additional terms.

FIG. 4 is a diagram illustrating an example flow of data in a search for personally identifiable information. FIG. 4 is described above with respect to the process of FIG. 3.

Figure 5:
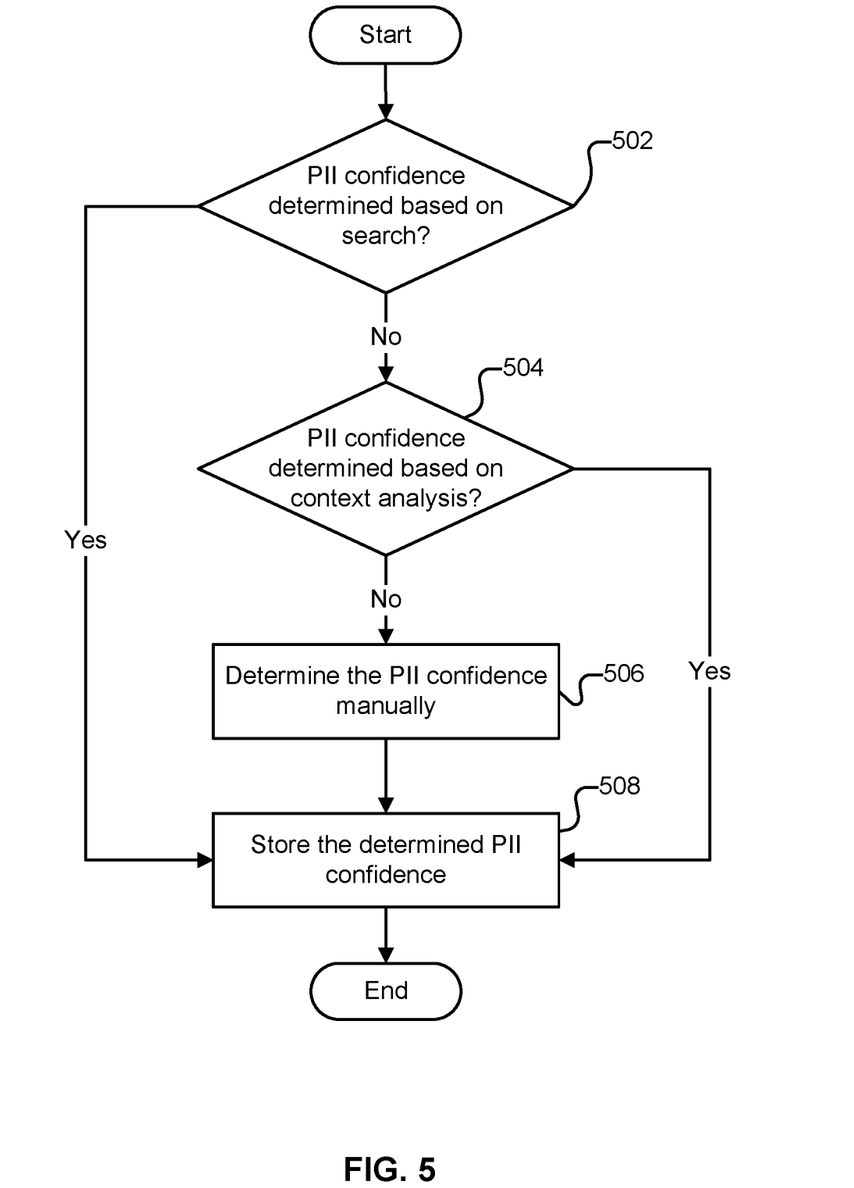
FIG. 5 is a flow chart illustrating an embodiment of a process for determining a confidence associated with an identification of a location storing personally identifiable information.

FIG. 5 is a flow chart illustrating an embodiment of a process for determining a confidence (also referred to herein as a PII confidence) associated with an identification of a location storing personally identifiable information. In some embodiments, the process of FIG. 5 is performed by PII scanner 114 of FIG. 1. In some embodiments, at least a portion of the process of FIG. 5 is performed in 304 of FIG. 3. In some embodiments, the PII confidence is selected from a discrete set of options (e.g., "High Confidence", "Medium Confidence", "Low Confidence", and "Unknown").

At 502, it is determined whether the PII confidence has been determined based on a search. In various embodiments, the search is an initial, automated PII search. In some embodiments, the search determines the PII confidence associated with a PII match based on a frequency with which one or more found keywords (e.g., base terms) are indicative of PII. For example, in most scenarios, finding the base term "social security number" indicates a high likelihood ("High Confidence") of PII because "social security number" is very infrequently used in non-PII situations. In some embodiments, a "Low Confidence" determination is a determination of high confidence that the location being examined does not store PII.

If at 502 the PII confidence has been (successfully) determined based on the search, at 508, the determined PII confidence is stored. For example, the determined confidence may be "High Confidence" or "Medium Confidence". If at 502 the PII confidence has not been determined based on the search, at 504, it is determined whether the PII confidence has been determined based on a context analysis. In some embodiments, context analysis is utilized if the PII confidence has been determined to be "Unknown" based on the search. An example of an "Unknown" determination is finding the base term "name" without any additional information, which is non-specific as to PII. It is also possible to perform a context analysis if the PII confidence has been determined to be "Medium Confidence" or any other specified confidence level that denotes an unacceptable level of uncertainty. In some embodiments, the context analysis includes determining how many associated locations (e.g., other fields in a table) also store PII. In some embodiments, this corresponds to determining how many locations that are within a specified proximity of a location in a database store PII. If many locations associated with a first location store PII, it may be inferred that the first location also stores PII. The context analysis may also include determining whether a field being examined is in a table that includes a reference to another table that stores PII, which indicates a greater likelihood (and thus higher confidence) that the field being examined stores PII. In various embodiments, context analysis includes examining neighboring fields and fields in linked tables.

If at 504 the PII confidence has been (successfully) determined based on the context analysis, at 508, the determined PII confidence is stored. For example, the determined confidence may be "High Confidence" or "Medium Confidence". If at 504 the PII confidence has not been determined based on the context analysis, at 506, the PII confidence is determined manually (e.g., by a human). For example, the presence or absence of PII may be determined during a manual validation step (e.g., 308 of FIG. 3). In some embodiments, manual analysis is performed if the PII confidence has been determined to be "Unknown" based on the context analysis. It is also possible to perform the manual analysis if the PII confidence has been determined to be "Medium Confidence" or any other specified confidence level that denotes an unacceptable level of uncertainty.

At 508, the determined PII confidence is stored. In some embodiments, the determined confidence is stored in memory associated with PII scanner 114 of FIG. 1. The determined confidence may be utilized to refine PII definitions and/or PII exclusions. A benefit of determining confidence is reduction of inaccuracy associated with indirectly searching for PII storage locations based on searching metadata corresponding to the storage locations.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A method, comprising:
storing a first item of personally identifiable information in a database;
dynamically causing a second item of personally identifiable information to be stored in a metadata source concomitantly with the storing of the first item of personally identifiable information in the database, wherein:
the metadata source is separate from the database; and
the second item of personally identifiable information includes metadata that describes:
a database record location of the first item of personally identifiable information, and
a type of the first item of personally identifiable information;
receiving a configuration associated with locating personally identifiable information stored in a database;
searching the metadata source using the configuration;
identifying a location of the second item of personally identifiable information in the metadata source; and
based on the identified location of the second item of personally identifiable information in the metadata source, providing the database record location of the first item of personally identifiable information without searching the database for the first item of personally identifiable information.

2. The method of claim 1, further comprising at least one of:
storing a result from searching the metadata source; or
transmitting the result to a user for validation of the result.

3. The method of claim 1, wherein at least a portion of the configuration is received via a network.

4. The method of claim 1, wherein the configuration includes at least one of:
a start time indicating when to automatically commence searching the metadata source; or
a list of keywords to search in the metadata source for which finding a keyword in the list of keywords indicates a presence of personally identifiable information in a corresponding database location.

5. The method of claim 1, wherein the database includes data stored in one or more table data structures.

6. The method of claim 1, wherein the database record location of the first item of personally identifiable information is a location of the first item of personally identifiable information within in one or more table data structures stored in the database.

7. The method of claim 1, wherein searching the metadata source includes searching for a combination of a base term and an additional term selected from a plurality of additional terms.

8. The method of claim 1, further comprising automatically determining an indication associated with a confidence that an identified location in the database stores personally identifiable information.

9. The method of claim 8, wherein:
automatically determining the indication associated with the confidence includes determining a total number of additional locations within a specified proximity to the identified location that store personally identifiable information; and
the additional locations include fields in a table.

10. The method of claim 1, further comprising requesting a reviewer to provide an indication associated with a confidence that an identified location in the database stores personally identifiable information in response to a determination that the confidence has not been determined automatically.

11. The method of claim 1, further comprising storing a list of locations in the database identified as storing personally identifiable information.

12. The method of claim 1, further comprising updating the received configuration based at least in part on results of searching the metadata source.

13. The method of claim 1, further comprising providing results of searching the metadata source to a user interface for display of the results.

14. The method of claim 1, wherein the database is provided by a third-party entity different from an entity managing the metadata source.

15. The method of claim 1, wherein the database stores at least one of the following types of personally identifiable information: a human name, an address, a social security number, a date of birth of a human, a place of birth of a human, a human mother's maiden name, a driver's license number, a bank account number, a passport number, or an email address.

16. The method of claim 1, wherein:
storing the first item of personally identifiable information in the database includes creating a database table in the database; and
dynamically causing the second item of personally identifiable information to be stored in the metadata source concomitantly with the storing of the first item of personally identifiable information in the database includes concomitantly with the creation of the database table, creating a corresponding metadata table in the metadata source, wherein the metadata table is also updated when the database table is updated to reflect updates to the database table.

17. The method of claim 1, wherein the location of the first item of personally identifiable information in the database is determined based at least in part to a correspondence to the second item of personally identifiable information in the metadata source.

18. The method of claim 1, wherein the metadata source is configured to store one or more table data structures, the one or more table data structures including one or more reference links to one or more other table data structures.

19. A system, comprising:
one or more processors configured to:
store a first item of personally identifiable information in a database;
dynamically cause a second item of personally identifiable information to be stored in a metadata source concomitantly with the storing of the first item of personally identifiable information in the database, wherein:
the metadata source is separate from the database; and
the second item of personally identifiable information includes metadata that describes:
a database record location of the first item of personally identifiable information, and
a type of the first item of personally identifiable information;
receive a configuration associated with locating personally identifiable information stored in a database;
search the metadata source using the configuration;

identify a location of the second item of personally identifiable information in the metadata source; and based on the identified location of the second item of personally identifiable information in the metadata source, provide the database record location of the first item of personally identifiable information without searching the database for the first item of personally identifiable information; and a memory coupled with the processor and configured to provide the processor with instructions.

20. A computer program product comprising a non-transitory computer readable storage medium having instructions having instructions stored thereon, when executed by a processor performing:

storing a first item of personally identifiable information in a database;

dynamically causing a second item of personally identifiable information to be stored in a metadata source concomitantly with the storing of the first item of personally identifiable information in the database, wherein:

the metadata source is separate from the database; and the second item of personally identifiable information includes metadata that describes:

a database record location of the first item of personally identifiable information, and a type of the first item of personally identifiable information;

receiving a configuration associated with locating personally identifiable information stored in a database;

searching the metadata source using the configuration;

identifying a location of the second item of personally identifiable information in the metadata source; and based on the identified location of the second item of personally identifiable information in the metadata source, providing the database record location of the first item of personally identifiable information without searching the database for the first item of personally identifiable information.

* * * * *